(12) United States Patent
Chhaya et al.

(10) Patent No.: US 10,784,703 B2
(45) Date of Patent: Sep. 22, 2020

(54) SYSTEM AND METHOD FOR MAINTAINING BATTERY LIFE

(71) Applicant: Texas Instruments Incorporated, Dallas, TX (US)

(72) Inventors: Harshal S. Chhaya, Plano, TX (US); Thomas Brian Olson, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/046,647

(22) Filed: Feb. 18, 2016

(65) Prior Publication Data
US 2017/0070063 A1 Mar. 9, 2017

Related U.S. Application Data

(60) Provisional application No. 62/213,998, filed on Sep. 3, 2015.

(51) Int. Cl.
*H02J 7/00* (2006.01)

(52) U.S. Cl.
CPC ............ *H02J 7/007* (2013.01); *H02J 7/0063* (2013.01)

(58) Field of Classification Search
CPC ... A61B 2017/00734; A61B 2090/061; H02M 1/44; G06F 1/3206; G06F 1/3212; H02J 3/381; H02J 1/10; H02J 7/0068; H02J 1/001; H02J 3/00; H02J 3/01; H02J 3/383; H02J 13/0006; H02J 2300/20; H02J 2310/10; H02J 2310/16; H02J 3/06; H02J 3/12; H02J 3/18; H02J 3/28; H02J 3/382; H02J 7/007; H02J 7/0021; H02J 7/0047; H02J 7/0048; H02J 13/0079; H02J 2300/26; H02J 3/1892; H02J 3/385; H02J 7/0003; H02J 7/0036; H02J 7/0069; H02J 7/00718; H02J 7/0077; H02J 7/0091; H02J 7/045; H02J 1/102; H02J 1/106; H02J 2300/24; H02J 2300/30; H02J 3/0073; H02J 3/387; H02J 50/001; H02J 50/10; H02J 50/80; H02J 7/00; H02J 7/00034; H02J 7/0029; H02J 7/0049; H02J 7/0063; H02J 7/0078; H02J 7/342; H02J 7/345; A61M 1/3656
USPC .................................................. 320/127–136
See application file for complete search history.

(56) References Cited

U.S. PATENT DOCUMENTS

| | | | | |
|---|---|---|---|---|
| 8,228,038 B2* | 7/2012 | Mullen | .................. | G06F 1/3203 320/135 |
| 2005/0001590 A1* | 1/2005 | Bayne | .................... | H02J 7/0027 320/128 |
| 2011/0068746 A1* | 3/2011 | Rocci | .................. | H01M 10/441 320/118 |
| 2011/0309795 A1* | 12/2011 | Firehammer | ......... | H02J 7/0014 320/118 |

(Continued)

*Primary Examiner* — Binh C Tat
(74) *Attorney, Agent, or Firm* — Rose Alyssa Keagy; Charles A. Brill; Frank D. Cimino

(57) ABSTRACT

A system and method is disclosed for monitoring current consumption of various subsystems and applications and adjusting functional parameters to ensure a constant current drain from the battery. The constant current drain can be dynamically adjusted based on a predetermined amount of battery life. A user can determine the amount of battery life to be required and the system adjusts current consumption of various subsystem components and applications to provide consistent and predictable battery life.

14 Claims, 2 Drawing Sheets

(56) References Cited

U.S. PATENT DOCUMENTS

| | | | |
|---|---|---|---|
| 2013/0214730 A1* | 8/2013 | Lu | H02J 7/007 320/107 |
| 2013/0300377 A1* | 11/2013 | Mao | B60L 11/14 320/152 |
| 2014/0225574 A1* | 8/2014 | Boda | H02J 7/0014 320/162 |
| 2016/0020624 A1* | 1/2016 | Chang | H02J 7/0029 320/136 |

* cited by examiner

SYSTEM AND METHOD FOR MAINTAINING BATTERY LIFE

CROSS-REFERENCE TO RELATED APPLICATIONS

This application claims priority to the U.S. provisional patent application Ser. No. 62/213,998, filed Sep. 3, 2015, the entirety of which is hereby incorporated herein by reference for all purposes.

TECHNICAL FIELD

This disclosure relates generally to the field of power management and particularly to battery life management in electronic devices.

BACKGROUND

Generally, in battery operated electronic devices, the amount of time a given battery can last becomes one of the important selection features for users. Electronic devices that run on battery such as mobile computing devices, smart phones, wireless communication devices, concurrently execute a variety of applications that use up different amount of battery power. For example, devices with different wireless technologies have different power requirements. In some cases, even for the same wireless technology, a wireless device may have different power usage based on certain characteristics such as for the same transmit power, the power consumption of WiFi (802.11) in the 5 Ghz band is typically higher than the power consumption in the 2.4 Ghz band. A wireless device typically switches between these two bands or even between two different wireless protocols (e.g. between WiFi and 4G) without user intervention. This results in variable current consumption which causes uneven and unpredictable battery life resulting in poor user experience.

To preserve battery power, conventional power management methods selectively reduce the power usage of certain applications such as for example, brightness of a display; however, these power management techniques are not based on dynamically monitoring the power and current usage of various subsystems of electronic devices, they do not affect the operating points of the electronic device, and do not guarantee a consistent and predictable battery life regardless of the current consumption of various applications.

DETAILED DESCRIPTION

The following description provides many different embodiments, or examples, for implementing different features of the subject matter. These descriptions are merely for illustrative purposes and do not limit the scope of the invention.

According to an embodiment, a system and method is provided for monitoring current consumption of various subsystems and applications in a device and dynamically adjusting characteristics and parameters of these subsystems and applications to ensure a constant current drain from the battery. The constant current drain can be dynamically adjusted based on a predetermined amount of battery life. A user can determine the amount of battery life to be required and the system adjusts current consumption of various subsystem components and applications to provide consistent and predictable battery life.

Figure 1:
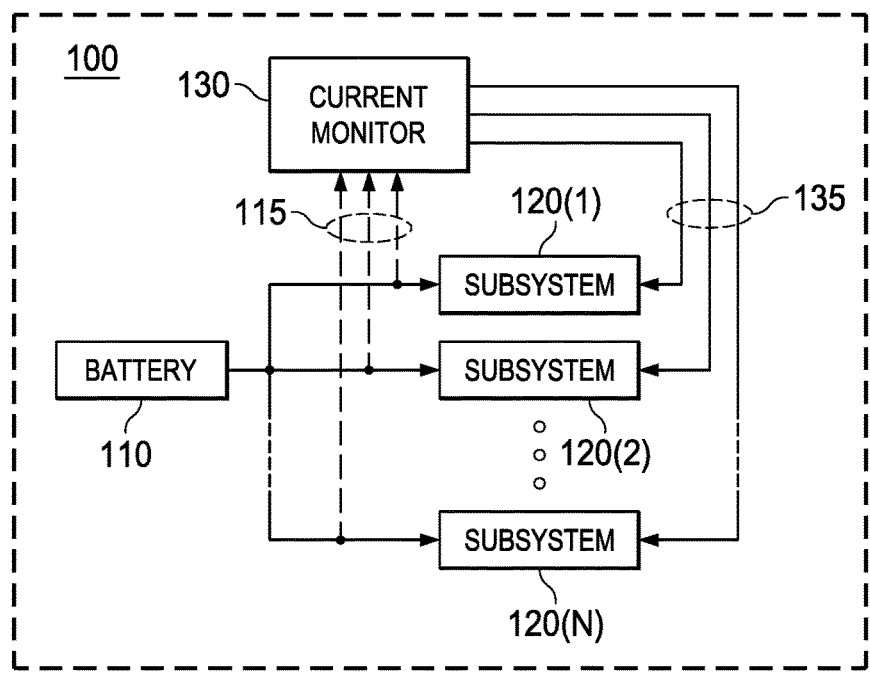
FIG. 1, illustrates an exemplary device with battery life management according to an embodiment.

Referring to FIG. 1, an exemplary device 100 with battery life management is illustrated according to an embodiment. Device 100 can be any battery operated electronic device such as for example a computer, smart phone, wireless communication device, electronic toys, industrial tools, and other devices. Device 100 includes a battery 110 and various subsystems 120(1)-(N) that draw power/current from the battery 110. Subsystems 120s can be any system component of device 100 such as for example a display, keyboards, processors, special purpose computing units, microcontrollers, clock generators, storage subsystems, user interface, motors, transceiver, radio controllers, networking devices, peripheral interfaces, peripheral devices, LEDs, graphic subsystems, software applications, and other subsystems. Each subsystem 120 draws current from battery 110 to operate and provide intended functions for device 100.

Device 100 includes a current monitor 130. Current monitor 130 monitors current draw, modes of operation, and functions of each subsystem 120 via exemplary input links 115 to determine current needs for each subsystem 120. While for explanation purposes, exemplary input links 115 are illustrated; however, current monitor 130 can monitor modes of operation and functions of subsystems 120 by monitoring the status of operation of each subsystem. For example, if a software application is configured to play an audio/video stream, then the current monitor 130 can monitor the execution of specific video play instruction codes in a processor's instruction execution unit and determine the amount of current that may be required for playing the audio/video stream. Similarly, if a wireless subsystem is transmitting data and switches the protocol based on the device settings or signal strengths, then the current monitor can determine the amount of current draw that may be required to facilitate the protocol switching.

The current monitor 130 monitors the current draw/need for each subsystem 120 and based on predetermined settings for expected battery life as explained herein, adjusts various parameters for subsystems 120 to control the current draw to maintain the consistent and predictable battery life. The current monitor 130 can adjust parameters for subsystems 120 via exemplary output links 135. As explained hereinabove, exemplary output links 135 are illustrated for explanation purposes only. The exemplary input links 115 and exemplary output links 135 can also be integrated into a two-way link or they can be multiplexed links. Current monitor 130 can adjust certain parameters and characteristics of subsystems 120 using various controls for each subsystem, thus reducing the current draw from the battery 110 and ensuring a consistent average current drain from the battery 110. The parameters/characteristics of subsystems 120 can include any functional or operational parameter/characteristics that can affect the current draw of the subsystem such as operating clock frequency, brightness/backlight of display, a particular wireless protocol, interface, and others that may affect the battery usage.

The current monitor 130 controls the operational parameters of a subsystem 120 that draws current and also balances between various applications and subsystems. For example, if a wireless connection interface/controller (e.g., WiFi etc.) switches to a mode that results in higher current consumption, then the current monitor 130 may reduce the backlight brightness of the display subsystem dynamically regardless of the brightness settings and ambiance light. The resulting reduction in the display brightness may not be noticeable to the user but may provide enough current to wireless connection interface to facilitate protocol switching to ensure that the total current draw (and hence battery life) of the device remains constant and as predicted. As stated hereinabove, the current monitor 130 may also select a different operating point (e.g., clock frequency, voltage, etc.) to adjust for the processing subsystems 120 to cause them to function at a lower operating current. In another embodiment, if a processing subsystem's frequency is raised to support a high-MIPS task such as video playback, then the current monitor 130 may reduce the display brightness and/or modify a wireless subsystem including changing the transmission power, disabling it for short intervals of time to support high current video play task and maintain an average constant system current consumption for the entire device 100.

The current monitor 130 can be an independent unit or integrated in any of the subsystems 120 depending on the functional structure of the device 100. In an embodiment, the current monitor can be integrated in any of the subsystems 120 such as for example, a processing unit subsystem. The processing unit subsystem can interface with various other subsystems 120 and provide current usage data to the integrated current monitor 130. In another embodiment, the current monitor 130 can be implemented as a software module in any of the subsystems for example, a processing unit or a microcontroller can be programmed to process current usage data for each subsystem 120 and based on predetermined battery life criteria, adjust operational parameters of subsystems 120.

In an embodiment, the current draw of a battery can be monitored and adjusted according to the following exemplary equation:

$$I_{avg} = B/H$$

Where 'B' is the battery capacity (power, voltage, current, etc.) and 'H' is expected battery life in hours. $I_{avg}$ is the predetermined average current draw per hour from the battery. For example, if a user desires that the battery of a device may last for 'H' hours, then given the battery capacity 'B', the maximum average current drawn per hour from the battery will be $I_{avg}$. The total current that can be drawn from the battery is typically given as the sum of all currents drawn by each subsystem:

$$\text{Total current } I_{total} = I_{subsystem\ 120(1)} + I_{subsystem\ 120(2)} + I_{subsystem\ 120(3)} + \ldots I_{subsystem\ 120(N)}$$

Therefore, the total average current drawn per hour $I_{avg\text{-}total}$ from the battery is the sum of average current drawn per hour by each subsystem and given as:

$$I_{avg\text{-}total} = I_{avg\text{-}subsystem\ 120(1)} + I_{avg\text{-}subsystem\ 120(2)} + I_{avg\text{-}subsystem\ 120(3)} + \ldots I_{avg\text{-}subsystem\ 120(N)}$$

Given the battery capacity 'B' and average hourly current draw $T_{avg}$, to obtain a battery life of 'H' hours:

$$I_{avg\text{-}total} \leq I_{avg}$$

The value 'H' of battery life can be predetermined or dynamically adjusted during the operation and based on available capacity 'B' of the battery. While for exemplary purposes 'hour' is used as exemplary time unit; however, it can be any form of unit such as for example seconds, minutes, days, months, etc. The current monitor 130 can limit total average current draw $I_{avg\text{-}total}$ for all subsystems to about $I_{avg}$. In an embodiment, the current monitor may dynamically determine functional current requirement for each subsystem and if the current monitor may determine that the average current requirement of all subsystems may exceed $I_{avg}$, then the current monitor may modify parameters and characteristics of other selected subsystems to ensure that the total current draw does not exceed $I_{avg}$. For example, during an operation, if a processing subsystem processes certain data at high clock frequency and at the same time, a wireless communication subsystem draws additional current for transitioning to a different protocol (e.g., from outdoor LTE to indoor WiFi to remove data traffic from cellular network etc.) then the current monitor can reduce the clock speed/frequency of the processing unit to slow down the operation while the wireless communication subsystems completes the transition—keeping the total average current requirement at or below $I_{avg}$. After the transition is complete, the current monitor may then restore the optimum clock speed for the processing unit.

The order of priority for each subsystem for current draw can be predetermined or dynamically adjusted. For example, in a limited network coverage area, a user may desire to download as much data from a network as possible while the network coverage lasts and the user may not be as concerned for processing speed for other subsystems of a device. In such case, the transceiver subsystem, wireless communication subsystem, and other communication related subsystems may take priority in drawing current from the battery while still keeping the average current draw to the predetermined average current value. This ensures that the device will have a predetermined battery life under all circumstances.

In an embodiment, the current monitor can dynamically adjust the battery life value for example, if a user has access to a battery charger, then the user may be liberal in using the battery current and may not force a predetermined battery life. In other cases when a user may not have access to a battery charger (e.g., traveling, outdoor activity, remote areas, etc.), then the user may become conservative in using battery and may want the device battery to last certain number of hours before the user can recharge the battery. In another embodiment, the current monitor may close idle applications or shut down certain subsystems that may not have been active for a predetermined amount of time but still draw battery current. In yet another embodiment, the current monitor may proactively identify and shut down subsystems that may not need to be active for certain period of time for example if a user is streaming an audio/video clip from a network, then the user may be interested in listening/watching the clip and may not need other subsystems during that time and the current monitor can reduce current draw from other subsystems and keep the average current draw to predetermined level.

Figure 2A:
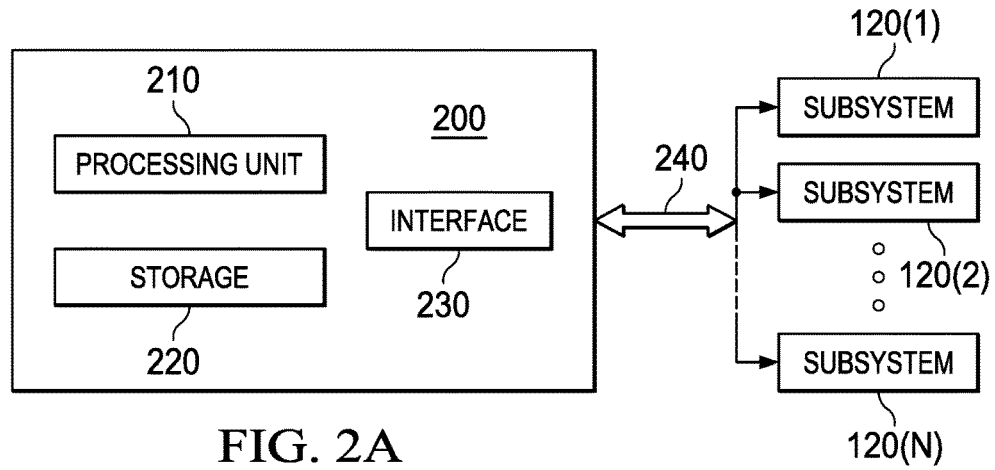
FIG. 2A illustrates an exemplary standalone implementation of current monitor according to an embodiment.

Referring to FIG. 2A, an exemplary standalone implementation of current monitor is illustrated according to an embodiment. Current monitor 200 can be an independent unit implemented in devices such as device 100 for monitoring battery current draw of various subsystems such as subsystems 120(1)-(N) as illustrated in FIG. 1. Current monitor 200 includes among various other units, a processing unit 210, a storage device 220, and an interface 230. Current monitor 200 can monitor current draw of subsystems 120(1)-(N) via any communication links such as for example link 240 through interface 230. While for exemplary purposes, various internal units for current monitor 200 are shown; however, these internal units can be integrated as a single unit for example, the current monitor 200 can be an integrated processing unit itself including storage and interface connections. The storage device can be any form of data storage such as the memory. The current monitor 200 can monitor current draw of subsystems 120 (1)-(N) and control functions of subsystems 120(1)-(N) using control data stored in the storage device 220. The control data can include estimated battery life, priority of subsystems 120, parameters and characteristics for subsystems 120 to control.

Figure 2B:
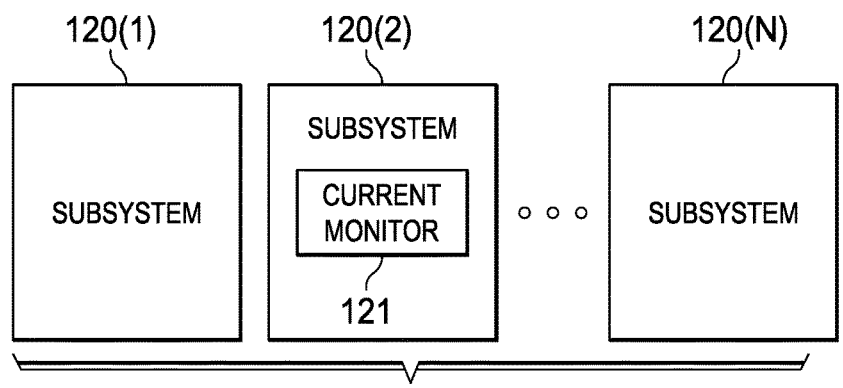
FIG. 2B illustrates another exemplary implementation of current monitor according to an embodiment.

Referring to FIG. 2B, another exemplary implementation of current monitor is illustrated according to an embodiment. In the present example, the current monitor 121 is integrated in one of the subsystems such as subsystem 120(2). The subsystem 120(2) can be any subsystem that can communicate with all subsystems (e.g., central processing unit) and monitor the current flow for them. The subsystem 120(2) can provide the current monitoring and control function along with its other functions.

Figure 2C:
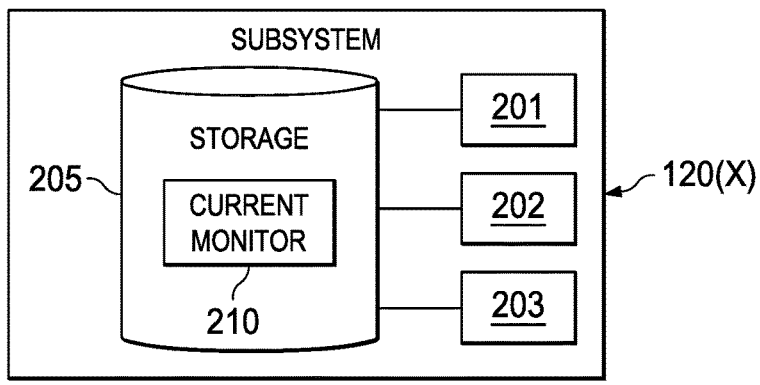
FIG. 2C illustrates yet another exemplary implementation of current monitor according to an embodiment.

Referring to FIG. 2C, yet another exemplary implementation of current monitor is illustrated according to an embodiment. In this exemplary embodiment, the current monitor is implemented as a software module 210 stored in a storage 205 within a subsystem 120(x). Storage 205 can be any internal memory unit (e.g., ROM/RAM) or can be an external system memory and the subsystem 120(x) may download the current monitor software module 210 either as embedded software or dynamically load it during a booting process or even down load it as a routine during normal operation to monitor and control current of various subsystems (internal or external) based on any instruction given by a user or any other subsystem. The subsystem 120(x) can be any subsystem in a device such as a processing unit with various internal functional units such as 201, 202, 203, and others. These units can be internal functional processing units such as power management, peripheral interface, user interface, displays, transceiver, communication interface, cache memory, instruction units, and similar subsystems. The current monitor software module 210 can include instructions stored in the storage 205.

Figure 3:
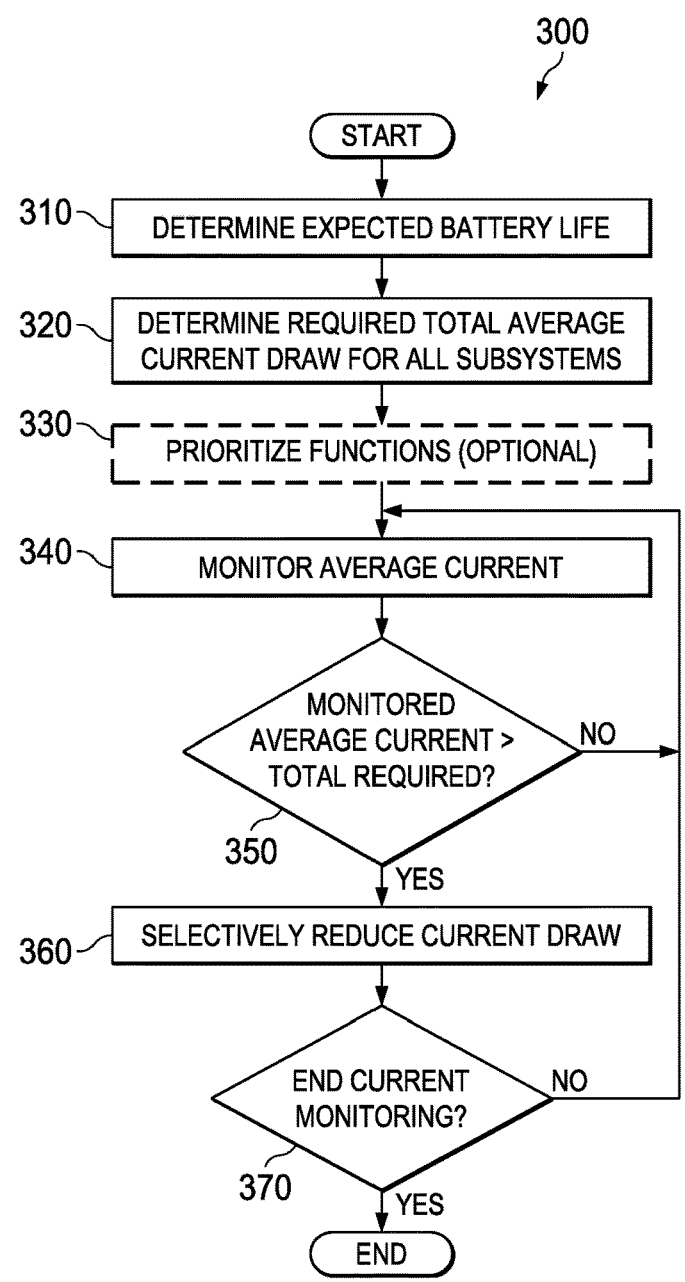
FIG. 3 illustrates an exemplary block diagram according to some embodiment.

Referring to FIG. 3, an exemplary flowchart of a process 300 for monitoring and managing current in a system is illustrated according to an embodiment. Initially at 310, the expected battery life of a given battery is determined. The expected battery life can be a predetermined default value or user specific, user defined value. As explained hereinabove, the battery life can be determined using the battery capacity and expected time the battery is required to last (in minutes, hours, days, etc.). Based on the required expected battery life, the required average current draw per time unit from the battery is determined at 320. The required total average current draw may be used as a benchmark predetermined required average current per time unit from the battery. The process can optionally prioritize various functions in the system at 330 for example, certain subsystems may take priority over others etc. The functional priorities can be set as default for certain systems or priorities can be determined dynamically by a user or any other control function of the system. For example, as stated herein, a user may overwrite priorities based on certain functional environment (poor network coverage, high power video streaming, etc.). Any given processing unit can also dynamically adjust priorities for example, if a processor is required to execute certain number of instructions atomically and some of those instructions may require high frequency operations, then the processor may set a flag, or indicator to indicate the priority to current monitoring process or the processor may even temporarily suspend the current monitoring and management for those instructions to ensure proper execution of those instruction.

The process monitors total average current draw of the system at 340 and compares it with the predetermined required average current at 350 to determine whether the monitored total average total average current from the battery of all subsystems and applications is within the predetermined required average current. If the monitored total average current draw from the battery is within the predetermined required average current limit, then the process continues to monitor the current draw at 340. If the monitored total average current draw from the battery for all subsystems and applications begins to exceed the predetermined required average current, then at 360, the process selectively reduces the current draw for various subsystems and application to ensure that the monitored total average current draw remains within the limit of predetermined required average current draw. The selective reduction of current draw can be based on priorities for various subsections and applications as explained herein. At 370, the process determined whether to end current monitoring and if the current monitoring does not need to be ended, then the process continues to monitor current at 340. By maintaining the total average current draw from the battery to at or below a predetermined required average current draw ensures that the battery will last at least about the predetermined amount of time based on the current draw of each subsystem and application.

The foregoing outlines features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims. Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Moreover, "exemplary" is used herein to mean serving as an example, instance, illustration, etc., and not necessarily as advantageous. Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A device comprising:
a current monitoring module configured to determine total current draw of one or more subsystems of the device from a battery; and
selectively reduce current draw of the one or more subsystems if the total current draw is more than a predetermined current draw from the battery;
wherein the current monitoring module selectively reduces the current draw of the one or more subsystems based at least in part on user input.

2. The device of claim 1, wherein the predetermined current draw is average current draw from the battery and is based at least in part on a predetermined time duration.

3. The device of claim 1, wherein the current monitoring module is further configured to select the one or more subsystems for current reduction based at least in part on a priority associated with each one of the one or more subsystems.

4. The device of claim 1, wherein the current monitoring module is integrated in the one or more subsystems.

5. The device of claim 1, wherein the current monitoring module is a software module integrated in the one or more subsystems.

6. The device of claim 1, wherein the current monitoring module is configured to selectively reduce the current draw of the one or more subsystems by adjusting one or more functional parameters of the one or more subsystems.

7. The device of claim 1, wherein one of the one or more subsystems is an application being executed in the device.

8. A method comprising:
determining total current draw of one or more subsystems of a device; and
selectively reducing current draw of the one or more subsystems if the total current draw is more than a predetermined current draw from the battery;
wherein the current draw of the one or more subsystems is selectively reduced based at least in part on user input.

9. The method of claim 8, wherein the predetermined current draw is average current draw from the battery and is based at least in part on a predetermined time.

10. The method of claim 8, further comprising
selecting the one or more subsystems for current reduction based at least in part on a priority associated with each one of the one or more subsystems.

11. The method of claim 8, further comprising adjusting one or more functional parameters of the one or more subsystems to reduce the current draw of the one or more subsystems.

12. An apparatus comprising:
a current monitoring component configured to determine total current draw of the apparatus from a battery; and
selectively adjust functional parameters of the apparatus to reduce the total current draw if the total current draw is more than a predetermined current draw from the battery;
wherein the current monitoring module selectively adjusts the functional parameters of the apparatus to reduce the total current draw based at least in part on user input.

13. The apparatus of claim 12, wherein the predetermined current draw is average current draw from the battery and is based at least in part on a predetermined time duration.

14. The apparatus of claim 12, wherein the current monitoring component is further configured to select the functional parameters based at least in part on a priority.

* * * * *